Oct. 6, 1936.   J. K. DOUGLAS   2,056,896
HYDRAULIC TRANSMISSION
Filed June 26, 1933   2 Sheets-Sheet 1

INVENTOR
JAMES K. DOUGLAS.
BY
ATTORNEY

Oct. 6, 1936.  J. K. DOUGLAS  2,056,896
HYDRAULIC TRANSMISSION
Filed June 26, 1933   2 Sheets-Sheet 2
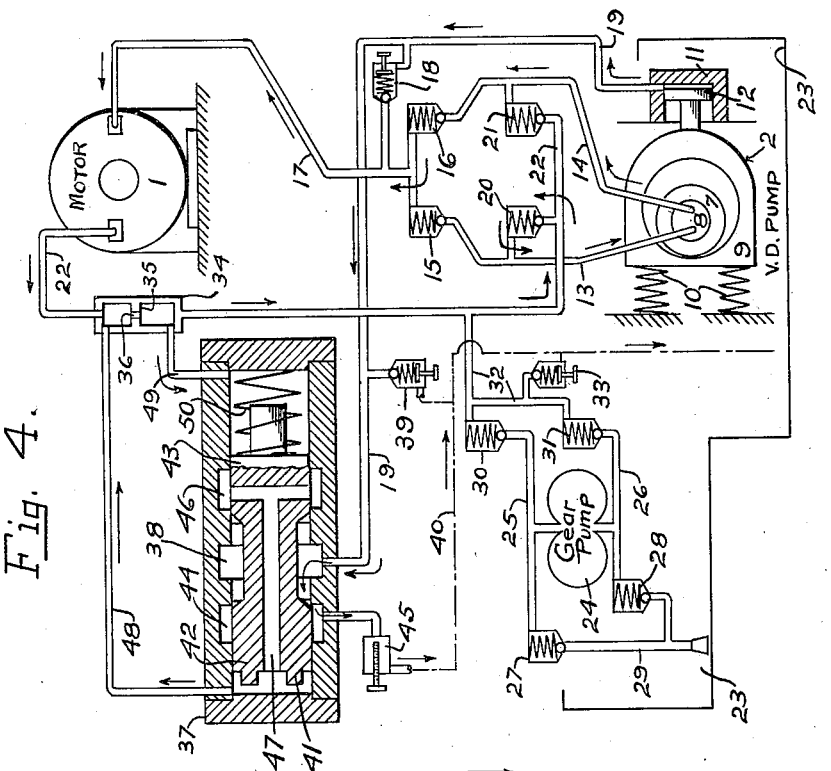
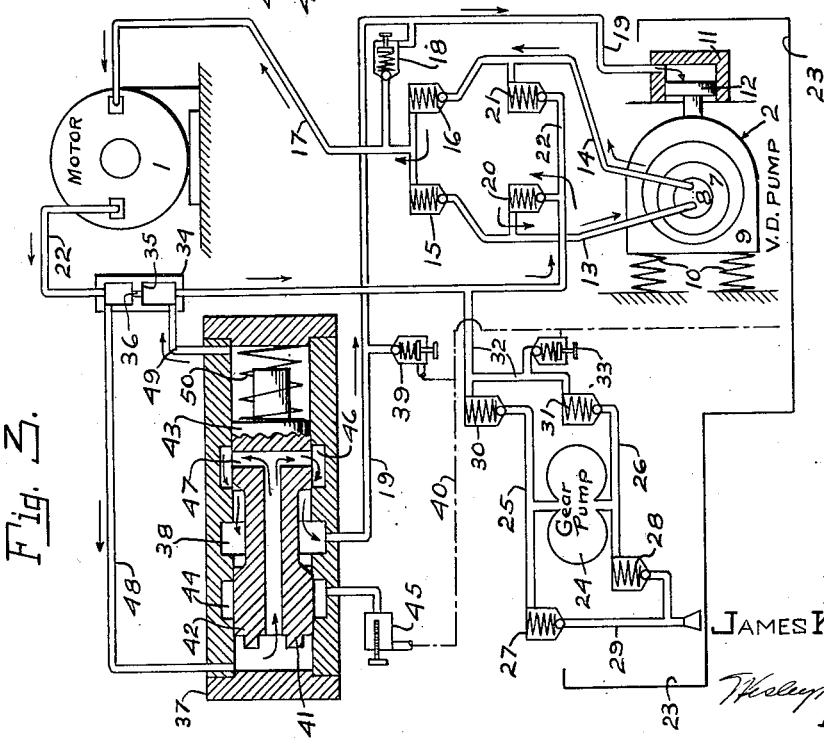
INVENTOR
JAMES K. DOUGLAS
ATTORNEY.

Patented Oct. 6, 1936

2,056,896

UNITED STATES PATENT OFFICE 2,056,896

HYDRAULIC TRANSMISSION

James K. Douglas, Milwaukee, Wis., assignor to The Oilgear Company, Milwaukee, Wis., a corporation of Wisconsin Application June 26, 1933, Serial No. 677,546

14 Claims. (Cl. 60—53)

This invention relates to hydraulic transmissions of the type which is provided with a hydraulic motor for driving a machine or a machine part, a pump for supplying liquid to the motor to drive the same, and control mechanism for controlling the motor.

The output or volumetric delivery of the pump depends upon both its displacement and the speed at which it is driven, and the speed of the motor depends upon both its displacement and the rate at which liquid is delivered thereto by the pump.

Ordinarily, the pump is driven at a substantially constant speed, and the speed of the motor is controlled by adjusting the displacement of either the pump or the motor.

It is sometimes desired to drive a machine or apparatus in a given direction at a constant speed from a power source which may operate in either direction and at varying speeds. For example, the refrigerating apparatus employed for cooling the interior of a vehicle must ordinarily be driven from an axle of the vehicle. The refrigerating apparatus should be driven in a given direction and at speeds which do not vary beyond a narrow speed range but the axle rotates in either direction, depending upon the direction of vehicle movement, and at speeds which depend upon the vehicle speed and vary through a very wide speed range.

The present invention has an object to provide a hydraulic transmission in which a pump driven at varying speeds will drive a hydraulic motor at a substantially constant speed.

Another object is to provide a hydraulic apparatus in which a hydraulic motor is driven at a substantially constant predetermined speed by liquid supplied from a power source which tends to deliver liquid to the motor faster than the rate required to drive it at the predetermined speed.

Another object is to provide a hydraulic transmission which is particularly adapted for the transmission of power from the axle of a vehicle to the apparatus employed to condition the air within the vehicle.

Another object is to provide a hydraulic transmission of this character which is positive and precise in operation.

Another object is to provide means for reducing pump delivery to approximately zero upon the pump or the apparatus driven thereby being subjected to a predetermined overload.

According to the invention in a general aspect and as ordinarily embodied in practice, the transmission is provided with a control which varies the relative displacements of the pump and the motor in response to variations in the velocity of the liquid to thereby maintain pump delivery substantially constant.

According to the invention in another aspect, a hydraulic motor is driven at a substantially constant speed by motive liquid supplied from a power source at a rate in excess of the rate required to drive the motor at a predetermined speed, the liquid exhausted from the motor passes through a throttle which causes the pressure of the exhaust liquid to drop as the liquid emerges from the throttle, and the rate at which the motive liquid enters the motor is controlled by means responsive to variations in the pressure drop across the throttle.

According to the invention in another aspect, means are provided for reducing pump displacement to zero in response to pump pressure exceeding a predetermined maximum.

The invention is exemplified by the hydraulic transmission illustrated schematically in the accompanying drawings in which the views are as follows:

Figs. 3 and 4 are views similar to Fig. 1 but showing the plunger of the control valve in two transitory positions.

Figure 1:
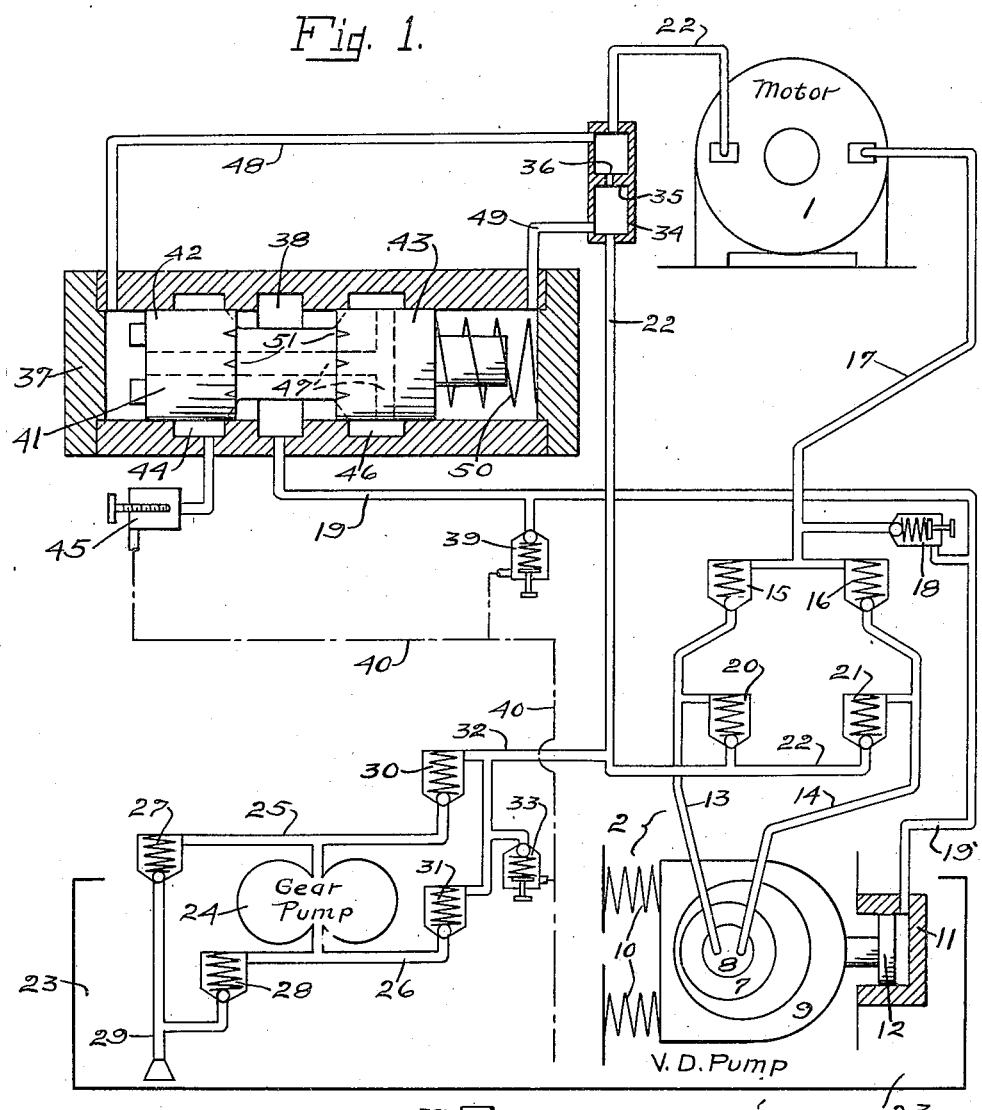
Fig. 1 is a diagram of the hydraulic circuit.
Figure 2:
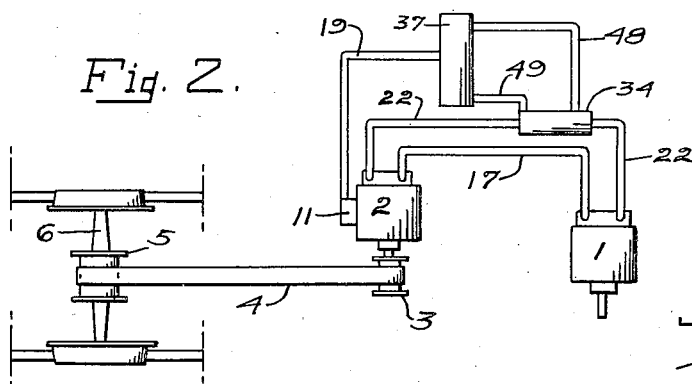
Fig. 2 is a schematic view showing the pump driven from the axle of a railway car.

The transmission is provided with a rotary hydraulic motor I for connection to the mechanism which is to be driven at a substantially constant speed, and with a rotary pump 2 which supplies motive liquid to the motor I and is driven in any suitable manner as by means of a pulley 3 which is fixed to the pump shaft and connected by a belt 4 to a pulley 5 fixed upon the axle 6 of a railway car, as shown in Fig. 2. The pump is driven from the axle 6 at speeds which vary in accordance with variations in the speed of the car.

The speed of the motor depends upon its displacement relative to the rate at which liquid is delivered thereto by the pump, and the pump delivery rate depends upon its displacement and the speed at which it is driven.

Since the pump 2 is driven at varying speeds, the relative displacements of the pump and the motor are varied in accordance with variations in pump speed in order to maintain the motor speed substantially constant.

The motor displacement may be varied directly in accordance with variations in pump speed or the pump displacement may be varied inversely to variations in pump speed. For the purpose of illustration, the transmission is shown provided with a constant displacement motor and a variable displacement pump.

The pump 2 may be any one of several types in which one part is movable relative to another part to change the pump stroke or displacement. A pump which may be employed is illustrated and described in application Serial No. 662,219 filed March 23, 1933 by Walter Ferris.

The pump shown in the above application has radial cylinders arranged in a cylinder barrel 7 which is journaled upon a stationary pintle 8. The cylinders have pistons fitted therein and engaged at the outer ends thereof by a thrust member 9 which is eccentric to the cylinder barrel when the pump is delivering liquid, and the stroke of the pump varies in accordance with variations in the distance between the center of the thrust member 9 and the center of the pintle 8.

The thrust member 9 is urged toward full stroke position by two springs 10 and toward zero stroke position by a hydraulic motor which ordinarily has its cylinder 11 secured to or formed integral with the pump casing and its piston 12 connected to the thrust member 9.

When the pump is in operation, it discharges into either a channel 13 or a channel 14 depending upon the direction of pump actuation and, when the pump is discharging into one of these channels, liquid is supplied to the pump through the other channel.

The channels 13 and 14 are connected, respectively, through a check valve 15 and a check valve 16 to one end of a discharge channel 17 which has its other end connected to the inlet of the motor 1. The check valves 15 and 16 allow liquid to flow freely from the pump to the motor but prevent it from flowing from the channel 13 to the channel 14 or vice versa. The pump thus delivers liquid through the discharge channel 17 to the motor in either direction of pump actuation.

The pressure created by the pump is limited by a high pressure relief valve 18 having its inlet connected to the discharge channel 17 and its outlet connected to a channel 19 through which liquid flows to and from the control cylinder 11 to vary the stroke of the pump as will be presently explained.

The channels 13 and 14 are also connected, respectively, through a check valve 20 and a check valve 21 to a return channel 22 which is connected to the outlet of the motor 1 and through which liquid is returned to the pump from the motor 1.

The check valves 20 and 21 allow liquid to flow freely from the return channel 22 into either the channel 13 or the channel 14 but prevent it from flowing in the opposite direction so that liquid discharged by the motor 1 is returned to the pump in either direction of pump actuation.

The pump shown in the above application is capable of drawing liquid into its cylinders from a nearby supply, but the pump 2 is ordinarily supplied with liquid from a reservoir 23 by a gear pump 24 which is incorporated in the pump 2 and driven in unison therewith in the well known manner and as shown in Patent No. 1,753,562 issued April 8, 1930 to John P. Ferris.

The gear pump is connected between a channel 25 and a channel 26 and draws liquid from the reservoir 23 through one of these channels and delivers it into the other channel in either direction of pump actuation.

The channels 25 and 26 are connected, respectively, through a check valve 27 and a check valve 28 to a suction pipe 29 which extends into the liquid in the reservoir 23. The check valves 27 and 28 permit the gear pump to draw liquid from the reservoir through the suction pipe 29 and either the channel 25 or the channel 26 but prevent it from discharging into the reservoir.

The channels 25 and 26 are also connected, respectively, through a check valve 30 and a check valve 31 to a gear pump discharge channel 32 which is connected to the return channel 22 intermediate the ends thereof. The check valves 30 and 31 allow liquid to flow freely from the channel 25 or the channel 26 into the channel 32 but prevent it from flowing in the opposite direction and also prevent the gear pump from discharging through the channel 25 into the channel 26 or vice versa.

The gear pump delivers liquid into the return channel 22 to compensate for leakage losses and to maintain a low pressure at the intake side of the variable delivery pump. Liquid delivered by the gear pump in excess of requirements is exhausted through a low pressure relief valve 33 which discharges into the reservoir 23.

In order to maintain the speed of the motor 1 constant throughout a wide range of pump speeds, the displacement of the pump 2 is varied inversely in accordance with variations in the rate at which liquid passes through the motor 1, as determined by the drop in pressure across a resistance or choke 34 which is connected in series with the motor and is provided intermediate the ends of its casing with a partition 35 having an orifice 36 therein through which the entire motor discharge passes.

The choke 34 may be connected into the pump discharge channel 17 but it is ordinarily connected into the motor exhaust or return channel 22 for the reason that the speed of a hydraulic motor is more nearly proportional to the rate at which liquid is discharged therefrom than it is to the rate at which liquid is delivered thereto.

A rotary hydraulic motor has as an inherent characteristic thereof an internal leakage or slip which varies in accordance with variations in the temperature and the pressure of the motive liquid. The slip consists of small volumes which escape from between the moving parts of the motor and the small volumes which pass across the face of the motor valve from the pressure port to the exhaust port thereof. A motor also has an apparent slip which is caused by the compressibility of the liquid, deflection of motor parts and expansion of fluid channels.

The motor speed is thus proportional to the rate of motor discharge except for the very small variation in the small volume which passes across the face of the motor valve from the pressure port to the exhaust port thereof and the small variation in the expansion of the liquid discharged from the motor cylinders. This variation is a very small percentage of the total variation in slip.

Therefore, by controlling the motor speed by means responsive to variations in the rate at which liquid is discharged from the motor, a given motor speed may be maintained within very close limits. In other words, the choke 34 is ordinarily connected into the motor discharge or return channel 22 in order to compensate for variations in the slip of the motor.

The resistance offered by an orifice to the flow of liquid therethrough varies in accordance with variations in the velocity of the liquid and, since the velocity of the liquid discharged from the motor 1 varies in accordance with variations in the motor speed, the pressure in the inlet end of the choke 34 and the magnitude of the pressure drop across the orifice 36 varies directly in accordance with variations in the motor speed.

The speed of the motor 1 is approximately proportional to the rate at which liquid is delivered thereto by the pump 2 and, since the pump 2 is driven at varying speeds, the motor speed may be maintained substantially constant by varying pump displacement. The displacement of the pump 2 is decreased by delivering liquid to the cylinder 11 and is increased by permitting liquid to escape therefrom.

The flow of liquid to and from the control cylinder 11 is controlled by a stroke control valve 37 which is connected to the cylinder 11 by the channel 19 and provided intermediate its ends with an annular groove 38 with which the channel 19 communicates.

The pressure in the cylinder 11 is limited by a relief valve 39 which has its inlet connected to the channel 19 and its outlet connected to a drain channel 40 which discharges into the reservoir 23.

The flow of liquid through the valve 37 is controlled by its plunger 41 which is closely fitted for reciprocation in the bore of the valve casing and provided at its left end with a piston 42 and at its right end with a piston 43. The groove 38 is open at all times to the space between the pistons 42 and 43.

The piston 42 controls an annular grove 44 which is formed in the valve casing and connected to the drain channel 40 through a choke 45 which limits the rate at which liquid can escape from the cylinder 11.

The piston 43 controls an annular groove 46 which is formed in the valve casing and open at all times to the left end of the valve casing through a duct 47 which extends axially inward from the left end of the plunger 41 and then radially outward through the piston 43.

The groove 46 thus communicates at all times through the duct 47 with the left end of the valve casing which is connected by a channel 48 to the choke 34 at the motor end thereof so that the pressure prevailing in the choke 34 at the motor side of the orifice 36 extends through the duct 47 to the groove 46. This pressure also acts upon the piston 42 and tends to move the plunger 41 toward the right.

The right end of the casing of the valve 37 is connected by a channel 49 to the discharge end of the choke 34 so that the pressure prevailing in the choke 34 at the other or discharge side of the orifice 36 acts upon the piston 43 and tends to move the plunger 41 toward the left.

The force exerted upon the piston 43 by the liquid is supplemented by a helical compression spring 50 which is arranged in the right end of the valve casing and urges the plunger 41 toward the left.

The spring 50 is calibrated to exert upon the piston 43 a force which is equal to the difference between the forces exerted by the liquid upon the pistons 42 and 43 when the motor 1 is operating at the desired speed.

For instance, if the area of the orifice 36 is such as to cause a difference of 10 lbs. per sq. in. in the pressure prevailing in the two ends of the choke 34 when the motor is operating at the desired speed, the spring 50 will be calibrated to normally exert upon the piston 43 a force equal to the force exerted thereon by a fluid pressure of 10 lbs. per. sq. in.

Therefore, when the motor 1 is operating at the desired speed, the sum of the forces acting upon the right end of the plunger 41 is equal to the force acting upon the left end thereof and the plunger is balanced or floats in the bore of the valve casing.

The distance between the inner edges of the pistons 42 and 43 may be equal to the distance between the inner edges of the grooves 44 and 46 so that, when the motor 1 is operating at the desired speed, the plunger 41 will float in the bore with the inner edge of each piston substantially in alinement with the inner edge of the corresponding groove.

However, the pistons 42 and 43 ordinarily overlap the adjacent or inner edges of the grooves 44 and 46 and are each provided with tapered slots 51 to cause the flow of liquid to and from the cylinder 11 to gradually increase as the plunger 41 is moved in one direction or the other.

If the speed of the pump 2 should increase, the motor 1 will tend to accelerate and discharge liquid at a faster rate through the orifice 36 which, due to the increase in the velocity of the liquid, will offer increased resistance to the flow of liquid therethrough and thereby cause an increase in the pressure of the liquid in the channel 48.

This increase in pressure will unbalance the plunger 41 and move it toward the right, as shown in Fig. 3, thereby opening the groove 46 to the groove 38 through the slots 51 and permitting liquid from the channel 48 to flow through the valve 37 and the channel 19 to the cylinder 11 and cause the piston 12 to move the thrust member 9 toward zero stroke position until the pump 2 is delivering just sufficient liquid to drive the motor 1 at the desired speed at which time the pressure in the channel 48 drops to the predetermined value and permits the plunger 41 to move toward the left to interrupt further flow of liquid to the cylinder 11 and to trap the liquid in the cylinder 11 to retain the thrust member 9 in its new position.

If the speed of the pump 2 should decrease, the motor 1 will tend to decelerate and discharge liquid at a slower rate through the orifice 36 which, due to the decrease in the velocity of the liquid, will offer less resistance in the flow of liquid therethrough and thereby cause a decrease in the pressure of the liquid in the channel 48.

This decrease in pressure will unbalance the plunger 41 and permit the spring 50 to move it toward the left, as shown in Fig. 4, to open the groove 38 to the groove 44 through the slots 51 and thereby permit the springs 10 to move the thrust member 9 toward full stroke position and force liquid out of the cylinder 11 through the channel 19, the valve 37 and the choke 45 into the drain channel 40; the choke 45 limiting the rate at which the liquid may be exhausted from the cylinder 11 to thereby prevent sudden movement of the thrust member 9.

The pump 2 will then deliver liquid at a faster rate and increase the speed of the motor 1 until the pressure in the channel 48 is increased sufficiently to move the plunger 41 to its normal position, at which time liquid is trapped in the cylinder 11 to retain the thrust member 9 in its new position.

When the transmission stops, pressure in the channel 48 will drop to zero, the spring 50 will move the plunger 41 against the left end of the valve casing to open the groove 38 to the groove 46 and permit the springs 10 to move the thrust member 9 to full stroke position.

Thereafter, when the transmission starts to operate the pump 2 will deliver liquid at full volume to the motor 2 and drive it at a speed proportional to pump speed until the pump speed has increased sufficiently to drive the motor at the desired speed. Then the control valve 37 will operate to decrease pump displacement and thereby maintain the speed of the motor constant at all higher pump speeds, as previously explained.

If the motor 1 should be subjected to a predetermined overload, the pressure in the discharge channel 17 will rise high enough to open the relief valve 18 and permit liquid to flow from the channel 17 through the channel 19 to the cylinder 11 and reduce pump displacement to substantially zero or until the pump 2 is delivering just sufficient liquid to maintain a predetermined pressure.

Liquid exhausted through the relief valve 18, in excess of the volume required to operate the motor 11—12, is exhausted through the relief valve 39 into the drain channel 40.

The invention herein set forth is susceptible of various modifications and adaptations without departing from the scope thereof as hereafter claimed.

The invention is hereby claimed as follows:

1. The combination, with a variable speed source of power, of a hydraulic motor, a pump driven at varying speeds from said source and hydraulically connected to said motor to drive the same, means for varying the displacement of said pump, and means responsive to variations in the velocity of the liquid discharged by said motor for operating said displacement varying means to vary pump displacement inversely to variations in pump speed.

2. The combination, with a variable speed source of power, of a hydraulic motor, a pump driven at varying speeds from said source and hydraulically connected to said motor to drive the same, hydraulically actuated means for varying the displacement of said pump, and means responsive to variations in the velocity of the liquid discharged by said motor for controlling the flow of liquid to and from said hydraulically actuated means to thereby vary pump displacement inversely to variations in pump speed.

3. In a hydraulic circuit having a pressure side and a return side, the combination of a pump for supplying liquid to said circuit, means for varying the displacement of said pump, and means responsive to variations in a drop in pressure between two parts of the return side of said circuit for operating said displacement varying means.

4. In a hydraulic circuit having a pressure side and a return side, the combination of a pump for supplying liquid to said circuit, hydraulic means for varying the displacement of said pump, and means responsive to variations in a drop in pressure between two parts of the return side of said circuit for controlling the flow of liquid to and from said hydraulic means.

5. A hydraulic transmission, comprising a hydraulic motor, a pump connected to said motor for delivering liquid thereto to drive the same, a choke connected in series with said motor, and means responsive to the drop in pressure across said choke for varying the relative displacements of said pump and said motor to thereby maintain the speed of said motor substantially constant.

6. A hydraulic transmission, comprising a hydraulic motor, a variable displacement pump connected to said motor for delivering liquid thereto to drive the same, a choke connected in series with said motor, and means responsive to the drop in pressure across said choke for varying the displacement of said pump to thereby maintain the speed of said motor substantially constant.

7. A hydraulic transmission, comprising a hydraulic motor, a pump connected to said motor for delivering liquid thereto to drive the same, a choke connected to the outlet of said motor to have the entire motor discharge pass therethrough, and means responsive to the drop in pressure across said choke for varying the relative displacements of said pump and said motor to thereby maintain the speed of said motor substantially constant.

8. A hydraulic transmission, comprising a hydraulic motor, a variable displacement pump connected to said motor for delivering liquid thereto to drive the same, a choke connected to the outlet of said motor to have the entire motor discharge pass therethrough, and means responsive to the drop in pressure across said choke for varying the displacement of said pump to thereby maintain the speed of said motor substantially constant.

9. A hydraulic transmission, comprising a hydraulic motor, a pump connected to said motor for delivering liquid thereto to drive the same and having hydraulically actuated means for changing its stroke, a choke connected in series with said motor, and means responsive to variations in the drop in pressure across said choke for controlling the flow of liquid to and from said hydraulically actuated means.

10. A hydraulic transmission, comprising a hydraulic motor, a pump connected to said motor for delivering liquid thereto to drive the same and having hydraulically actuated means for changing its stroke, a choke connected in series with said motor, and a hydraulically actuated valve operable in response to variations in the drop in pressure across said choke for controlling the flow of liquid to and from said hydraulically actuated means.

11. A hydraulic transmission, comprising a hydraulic motor having a pump discharge channel connected to its inlet and an exhaust channel connected to its outlet, a variable displacement pump operable in either direction, means connecting said discharge channel to the outlet of said pump and said exhaust channel to the intake of said pump in either direction of pump actuation, an auxiliary pump operable in either direction, means for directing liquid from said auxiliary pump into said exhaust channel in either direction of actuation of said auxiliary pump, and means for varying the displacement of said variable pump in response to variation in the velocity of the liquid supplied to said motor.

12. A hydraulic transmission, comprising a hydraulic motor having an inlet, a pump having fluid actuated means for varying its displacement, means for directing liquid from said pump to said motor inlet in either direction of pump actuation, and a relief valve connected between said fluid directing means and said displacement varying means for the passage of liquid therebetween upon pump pressure exceeding a predetermined maximum.

13. The combination, with a variable speed source of power, of a pump driven at varying speeds from said source, a hydraulic motor driven by said pump, means for varying the displacement of said pump, and means operating independently of said motor and responsive to variations in the velocity of the liquid discharged by said motor for operating said displacement varying means to vary pump displacement inversely to variations in pump speed.

14. The combination, with a variable speed source of power, of a pump driven at varying speeds from said source, a hydraulic motor driven by said pump, hydraulically actuated means for varying the displacement of said pump, and means operating independently of said motor and responsive to variations in the velocity of the liquid discharged by said motor for controlling the flow of liquid to and from said hydraulically actuated means to thereby vary pump displacement inversely to variations in pump speed.

JAMES K. DOUGLAS.

DISCLAIMER 2,056,896.—*James K. Douglas*, Milwaukee, Wis. HYDRAULIC TRANSMISSION. Patent dated October 6, 1936. Disclaimer filed January 22, 1938, by the assignee, *The Oilgear Company*.

Hereby enters this disclaimer to claims 5 and 6, except when the displacement varying means specified in said claims is operated by power supplied from a source other than said pump.

[*Official Gazette February 15, 1938.*]